(12) United States Patent
Corwin et al.

(10) Patent No.: US 6,550,001 B1
(45) Date of Patent: Apr. 15, 2003

(54) METHOD AND IMPLEMENTATION OF STATISTICAL DETECTION OF READ AFTER WRITE AND WRITE AFTER WRITE HAZARDS

(75) Inventors: Michael P. Corwin, Sunnyvale, CA (US); Dale Calvin Morris, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/183,156

(22) Filed: Oct. 30, 1998

(51) Int. Cl.[7] .................................................. G06F 9/30
(52) U.S. Cl. ........................................................ 712/216
(58) Field of Search ................................ 712/216, 217, 712/218, 219

(56) References Cited

U.S. PATENT DOCUMENTS

| | | | | |
|---|---|---|---|---|
| 5,497,499 A | * | 3/1996 | Garg et al. | 712/217 |
| 5,768,555 A | * | 6/1998 | Tran et al. | 712/216 |
| 5,850,533 A | * | 12/1998 | Panwar et al. | 712/216 |

* cited by examiner

Primary Examiner—Richard L. Ellis

(74) Attorney, Agent, or Firm—Blakely, Sokoloff, Taylor & Zafman LLP

(57) ABSTRACT

An apparatus is provided for detecting instruction ordering dependencies. The apparatus includes a plurality of address comparators. Each comparator including a first input adapted to receive a first operand address from one of a plurality of instructions; a second input adapted to receive a second operand address from a second one of a plurality of instructions; and an output to transmit a logic signal responsive to a match between the first and second operand addresses. The address comparators receive the first operand address from a respective, different ones of the plurality of instructions; and a hardware structure to receive the match indications from the address comparators and to indicate a dependency responsive to the match indications from a first one and a second one of the address comparators. A method is provided for detecting instruction dependencies. The method includes receiving first and second pluralities of operand addresses that correspond to first and second pluralities of operands of instructions, and selecting ones of the first and second pluralities of operands. The ones of the first and second pluralities of operands have associated respective first and second register addresses. The one of the first plurality of operands is a destination operand of a first instruction. The method also includes generating a logic signal for a dependency in response to the first and second register addresses matching and the ones of the first and second pluralities of operands being operands from different instructions.

34 Claims, 13 Drawing Sheets

METHOD AND IMPLEMENTATION OF STATISTICAL DETECTION OF READ AFTER WRITE AND WRITE AFTER WRITE HAZARDS

BACKGROUND OF THE INVENTION

1. Field of the Invention

This invention relates generally to the detection of matching character pairs in arbitrarily long strings, and more specifically, to detecting ordering dependencies for instructions in the same and in different issue groups within computer systems.

2. Description of the Related Art

Processors and computers execute sequenced instructions. Frequently, the instructions of the sequence exhibit ordering dependencies commonly referred to as write-after-write and read-after-write dependencies. Write-after-write (WAW) and read-after-write (RAW) dependency occurs when a first instruction writes to an address and a later instruction performs a respective write or read at the same address. If the execution order of a WAW or a RAW instruction pair changes, the results produced by the execution of the instruction pair may change.

As used herein, "destination addresses" are data storage addresses to which an instruction writes data, and "source addresses" are data storage addresses from which instructions read data. Together the destination and source addresses form the operand addresses or arguments of the instructions that write and/or read these addresses.

The presence of instruction ordering dependencies in certain subsequences of instructions can lead to undesirable consequences such as undefined behaviors and/or hardware damage. For example, the presence of a WAW instruction pair in a group of instructions for parallel execution can lead to undefined behaviors because either instruction of the pair may perform the last write to a data storage address. Since the last write determines the data stored at the data storage address, the absence of certainty as to which instruction will write last can lead to a loss of certainty as to what data is stored therein. The presence of a WAW instruction pair in a group of instructions for parallel execution can also lead to hardware damage, because the two instructions of the pair may write simultaneously. If the two instructions attempt to simultaneously write different logic signals to the same data storage address, a short circuit may occur causing hardware damage. Similar undesirable consequences may follow from the presence of a RAW instruction pair in a group of instructions for parallel execution. A processor may have hardware for detecting and alerting the presence of undesirable ordering dependencies.

The subsequences of instructions in which hardware design makes ordering dependencies undesirable are referred to as instruction groups. Compilers and other software may schedule instructions with ordering dependencies in hardware defined instruction groups. Thus, the detection of software generated WAW and RAW ordering dependencies may be important if such dependencies are to be avoided in instruction groups. The detection of such ordering dependencies may be useful in redesigning software.

In processors executing many instructions in parallel, the number of instructions for undesirable ordering dependencies requiring checking ordinarily increases. Furthermore, the number of registers to check for undesirable instruction dependencies frequently grows faster than the number of instructions in an instruction group. Thus, in processors that execute several instructions in parallel, the detection of ordering dependencies in an instruction group may involve a significant amount of hardware, i.e., a large area of a chips surface. In such processors, verifying the absence of undesirable dependencies may be both costly and time limiting.

The present invention is directed to overcoming, or at least reducing the effects of, one or more of the problems set forth above.

SUMMARY OF THE INVENTION

In a first aspect of the present invention, an apparatus is provided for detecting instruction ordering dependencies. The apparatus includes a plurality of address comparators including a first input adapted to receive a first operand address from one of a plurality of instructions; a second input adapted to receive a second operand address from a second one of a plurality of instructions; an output to transmit a logic signal responsive to a match between the first and second operand addresses; wherein the address comparators receive the first operand address from a respective, different ones of the plurality of instructions; and a hardware structure to receive the match indications from the address comparators and to indicate a dependency responsive to the match indications from a first one and a second one of the address comparators.

In a second aspect, a method is provided for detecting instruction dependencies. The method includes receiving first and second pluralities of operand addresses that correspond to first and second pluralities of operands of instructions, and selecting ones of the first and second pluralities of operands. The ones of the first and second pluralities of operands have associated respective first and second operand addresses. The one of the first plurality of operands is a destination operand of a first instruction. The method also includes generating a logic signal for a dependency in response to the first and second operand addresses matching and the ones of the first and second pluralities of operands being operands from different instructions.

BRIEF DESCRIPTION OF THE DRAWINGS

Other objects and advantages of the invention will become apparent upon reading the following detailed description and upon reference to the drawings in which.

Figure 1A:
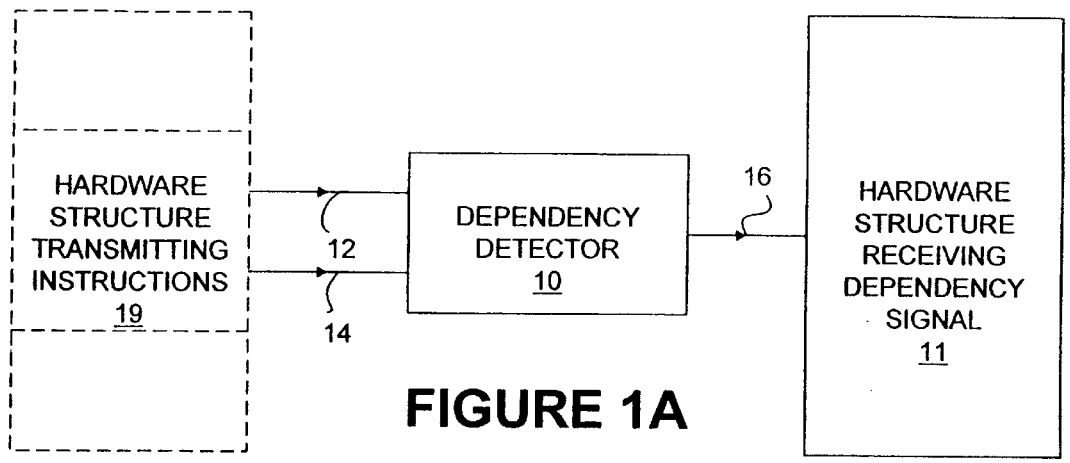
FIG. 1A is high-level block diagram of a detector for instruction ordering dependencies.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The invention in its various embodiments provides generally for the detection of matching character pairs in arbitrarily long strings and specifically for detecting write-after-write (WAW) and/or read-after-write (RAW) dependencies within an instruction group. Instruction groups are chararterized or defined by subsequences of instructions within which RAW and/or WAW dependencies should not occur. The boundaries of individual instruction groups may be different in the various embodiments. As stated herein, "statistical" is used to designate detector predictability to a statically predictable value providing 100 per cent coverage of a particular set of characters.

In one embodiment, an instruction group is an ordered subsequence. The first instruction of the subsequence is either the target of a branch instruction, the target of an execution exception, or the first instruction following a stop instruction. The last instruction of the subsequence is either a taken branch, an excepting instruction or a stop instruction. The programmer or hardware may, in some embodiments, introduce additional boundaries to instruction groups by inserting stop instructions into the instruction sequence, i.e., stop instructions specifically allow flexibility in defining individual instruction groups.

Instruction groups may comprise single issue groups, i.e., a group of instructions dispatched for execution in parallel, or may span several issue groups. Thus, undesirable ordering dependencies may occur either within one issue group, i.e., intra-issue group dependencies, or between different issue groups, i.e., inter-issue group dependencies. The various embodiments detect intra-issue group dependencies by comparing destination addresses of first instructions to operand addresses, i.e., destination and/or source addresses, of second instructions of the same issue group. The various embodiments detect inter-issue group dependencies by comparing the destination addresses of instructions from earlier issue groups to the destination and/or source addresses of instructions of later issue groups of the same instruction subsequence. The various embodiments clear the list of destination addresses to be used for comparisons at the beginning of each new instruction subsequence.

FIG. 1A illustrates a dependency detector 10 in accordance with one embodiment of the present invention. The dependency detector 10 has first and second inputs 12, 14 for receiving operand addresses to be checked for WAW and/or RAW dependencies. First and second inputs 12, 14 can be instructions from a hardware structure 19 such as a memory management module. In the various embodiments, the first input 12 receives destination register addresses to be written by the instruction group under consideration. The second input 14 receives the register addresses to be compared with the destination register addresses received on the first input 12. The operand addresses for embodiments detecting WAW dependencies are destination addresses and source addresses for embodiments detecting RAW dependencies, respectively. The inputs 12, 14 may receive operand addresses from the same issue group to detect intra-issue group dependencies or from different issue groups to detect inter-issue group dependencies. The dependency detector produces a logic signal on an output 16 in response to detecting an instruction dependency. Match indications from the output 16 are received by a hardware structure 11 (e.g., chip module) for indication of a dependency. In various embodiments, the detector 10 detects WAW and/or RAW dependencies intra- and/or inter-issue groups.

Figure 1B:
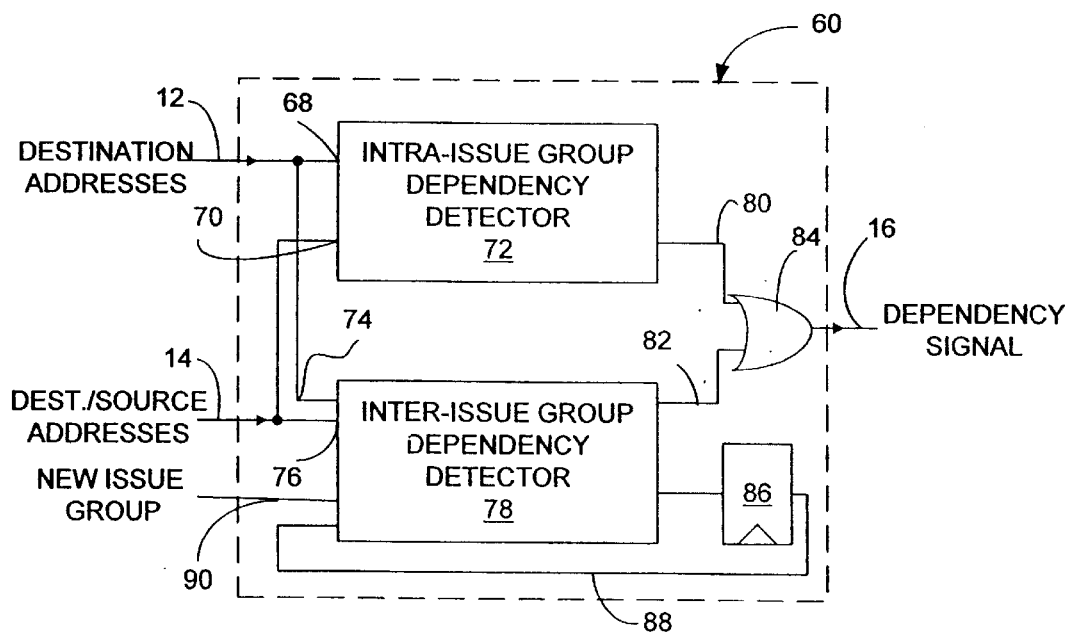
FIG. 1B is a high-level block diagram of one embodiment of a dependency detector.

Now, referring to FIG. 1B, one embodiment 60 of the detector 10 of FIG. 1 detects dependencies both within and between issue groups, although this is not necessary to the practice of the invention. As noted above, some embodiments may detect only intra-issue group dependencies, some may detect only inter-issue group dependencies, and some may detect both. Thus, in alternative embodiments, the detector 10 may include only an intra-issue group dependency detector such as the intra-issue group dependency detector 72 discussed below or only an inter-issue group dependency detector such as the inter-issue group dependency detector 78 discussed below. The inputs 12, 14 connect to first and second input terminals 68, 70 of an intra-issue group detector 72. The intra-issue group detector 72 produces a signal of logic one on an output line 80 in response to the destination address of a first instruction being the same as the operand address of a later instruction in the same issue group. In the various embodiments, the operand addresses on input 14 are destination addresses, source addresses, or both. The inputs 12, 14 also connect to first and second inputs 74, 76 of an inter-issue group dependency detector 78. The inter-issue group detector 78 produces a signal of logic one on an output line 82 in response to the destination address from a first issue group being the same as an operand address of a later issue group. In some embodiments, an OR-gate 84 receives the logic signals from the lines 80, 82 and produces a logic signal to indicate dependencies either within or between issue groups. An input 90 on the inter-issue group detector 78 signals each issue group. In other embodiments, a scoreboard storage, e.g., the storage 42 of FIG. 2, replaces the OR-gate 84 so that the identities of individual instruction pairs registering dependencies can be recorded.

Still referring to FIG. 1B, the inter-issue group detector 78 generates a comparison state vector that indicates destination addresses from previous issue groups of the same instruction subsequence. In response to a signal on the input 90, an accumulation register 86 stores the state vector. The accumulation register 86 feeds the stored state vector back into the inter-issue group detector 78 through a line 88. The inter-issue detector 78 compares the signal from the line 88 to the operand addresses from the new issue group at the inputs 74, 76 to determine whether to generate a match logic signal representing an address match on the line 82.

1. Scoreboard detectors

Figure 2:
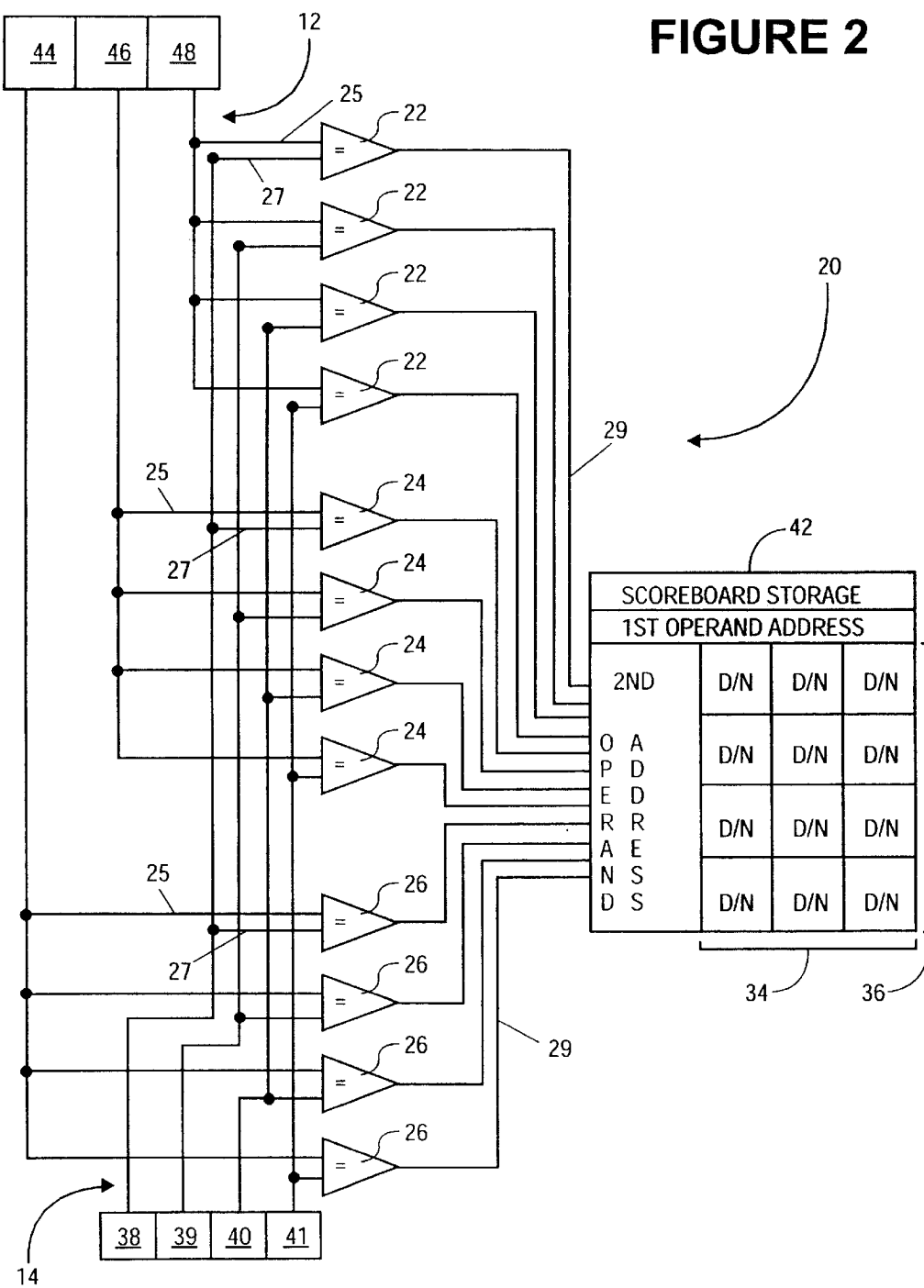
FIG. 2 is a circuit diagram illustrating a scoreboard detector for instruction dependencies.

The dependency detector 10 of FIG. 1 may be implemented in some embodiments as a "scoreboard detector." FIG. 2 illustrates a scoreboard detector 20 for detecting either RAW or WAW dependencies in accordance with a second embodiment. The scoreboard detector 20 includes an array of address comparators 22, 24, 26 that compare first operand addresses to second operand addresses. In the particular embodiment illustrated, the first operand addresses are destination addresses and the second operand addresses are either source or destination addresses. For a RAW or WAW dependency detector, the first operand addresses in storage positions 44, 46, 48 and the second operand addresses in storage positions 38, 39, 40, 41 would be the destination addresses and source addresses, respectively. The inputs 12 transmit the first destination addresses from storage positions 44, 46, 48 to the first inputs 25 of the address comparators 22, 24, 26. The inputs 14 transmit the second operand addresses from storage positions 38, 39, 40, 41 to the second inputs 27 of the address comparators 22, 24, 26. Each address comparator 22, 24, 26 receives operand addresses from two different instructions of the instruction group on the two inputs 25, 27 thereto. In the illustrated scoreboard detector 20, the address comparators 22, 24, 26 compare the three first operand addresses to four second operand addresses. The address comparators 22, 24, 26 produce output signals on lines 29 having the value of logic one in response to matches between operand addresses of pairs of instructions. Otherwise, the output signals of the comparators 22, 24, 26 have the value of a logic zero.

Still referring to FIG. 2, output lines 29 from the comparators 22, 24, 26 connect to a scoreboard storage unit 42. The scoreboard storage unit 42 is organized into columns 34 and rows 36 of the binary storage cells. Data in the storage cells indicates which instruction pairs are dependent (D) and which instructions pairs are not dependent (N). The columns 34 and rows 36 correspond to respective first operand addresses from storage positions 44, 46, 48 and second operand addresses from storage positions 38–41 for pairs of instructions. The output logic signals from the address comparators 22, 24, 26 write dependency data to corresponding row/column storage cells of the scoreboard storage unit 42. Thus, the scoreboard detector 20 provides information as to which instruction pairs have dependencies.

Still referring to FIG. 2, some alternative embodiments of scoreboard detector 20 detect both RAW and WAW. Such embodiments may employ a separate one of the scoreboard detectors 20 for detecting RAW dependencies and a separate one of the scoreboard detectors 20 for detecting WAW dependencies. Other embodiments have separate address comparators 22, 24, 26 for detecting RAW and WAW dependencies, respectively, but share the positions 44, 46, 48 that store the first operand addresses for comparison with two sets of second operand addresses, i.e., source and destination addresses.

Figure 3:
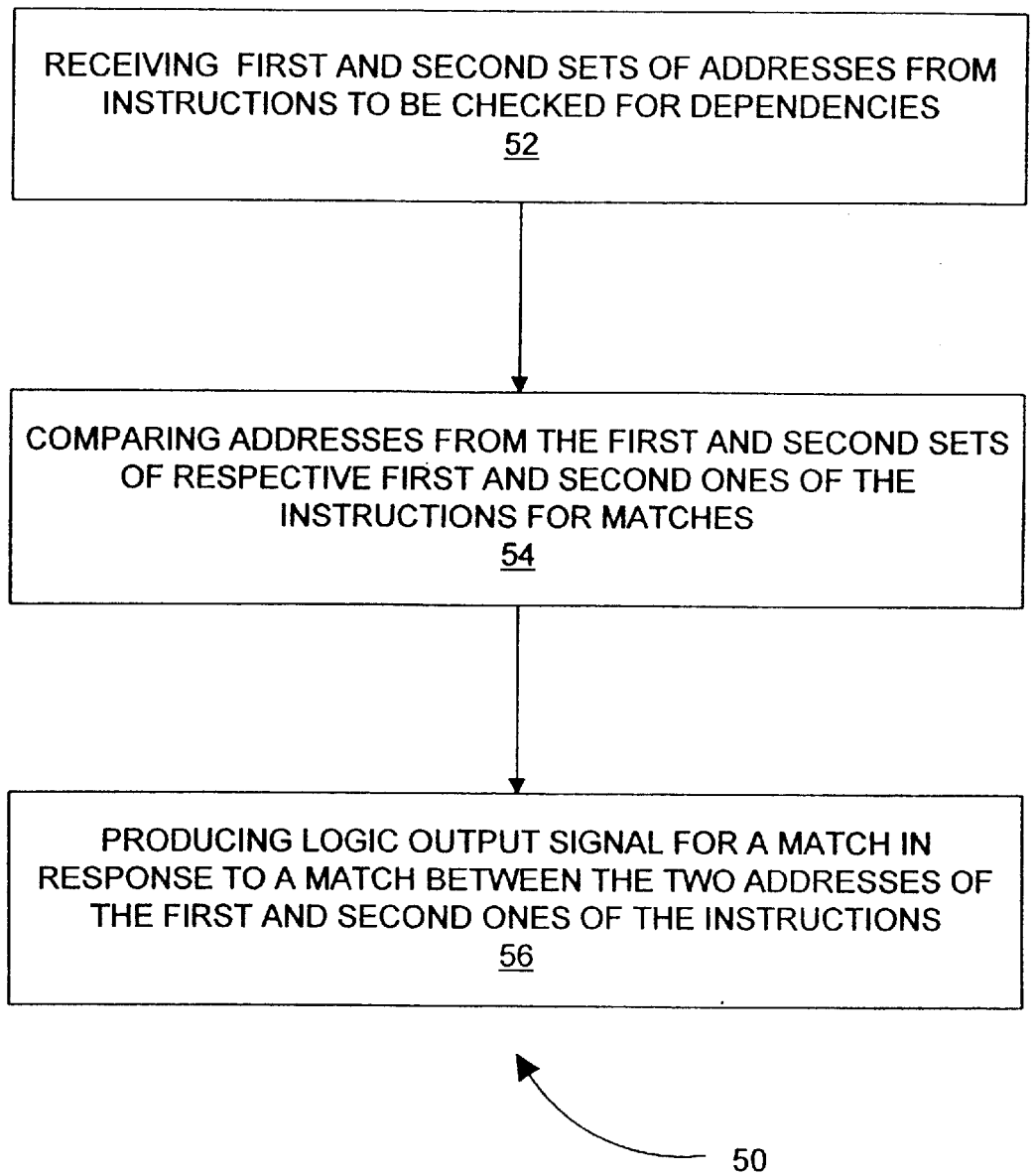
FIG. 3 is a flowchart illustrating a method of using the scoreboard detector of FIG. 2.

FIG. 3 is a flowchart illustrating a method 50 of operating the scoreboard detector 20 of FIG. 2. At block 52, the scoreboard detector 20 receives first and second sets of operand addresses from the instructions to be checked for dependencies. In one embodiment, the sets of operand addresses are received sequentially as new issue groups are processed. At block 54, the address comparators 22, 24, 26 compare addresses of the first and second sets of instructions for matches. Each pair of addresses compared corresponds to a pair of instructions. For second sets that are source addresses and destination addresses, respectively, the matches indicate RAW and WAW dependencies, respectively. In the above-described embodiment, the comparison step of block 54 occurs in response to receiving the operand addresses of the last issue group of the instruction subsequence under consideration. At block 56, one of the address comparators 22, 24, 26 produces an output signal for a match in response to a match between the two sets of operand addresses being compared.

Referring to both FIGS. 2 and 3, the scoreboard detector 20 uses a number of address comparators 22, 24, 26 equal to the number of pairs of operand addresses being compared. Thus, the number of address comparators 22, 24, 26 grows faster than the size of the instruction groups. Often, processors (not shown) that execute large issue groups also have large hardware defined instruction groups. In such processors, the scoreboard detector 20 would use a large number of address comparators 22, 24, 26 to compare the operand addresses of all the instruction pairs of the instruction group. In such embodiments, the address comparators can take up a sizable space on the chip die because operand addresses are typically several bits long and the address comparators to compare such addresses are often large devices. Other dependency detectors may employ less hardware to detect the "types" of instruction dependencies as opposed to all "actual occurrences" of each type of dependency. However, the present invention is not so limited. The scoreboard detector 20 can detect all occurring dependencies.

2. Statistical Dependency Detectors

The dependency detector 10 of FIG. 1 may also, in some embodiments, be implemented as a "statistical dependency detector." The embodiments for statistical dependency detectors are adapted to probabilistic detection of instruction dependencies and employ pseudo-randomly selected operand addresses or operands. The detection of dependencies in an incoming issue group checks either a portion of the operand addresses or a portion of the operands. The pseudo-random selection may change for each new instruction group or for each new issue group so that dependency detection takes on a more statistical character. Since only a portion of the operand addresses/operands are checked at any given time, by randomizing the selection, an equal probability of detection is provided and the detectors may employ less hardware than scoreboard detectors while providing overall detection. Thus, the statistical dependency detectors may be used to determine the compatibility of software instruction scheduling with hardware constraints on instruction dependencies through tests performed during operation.

Figure 4A:
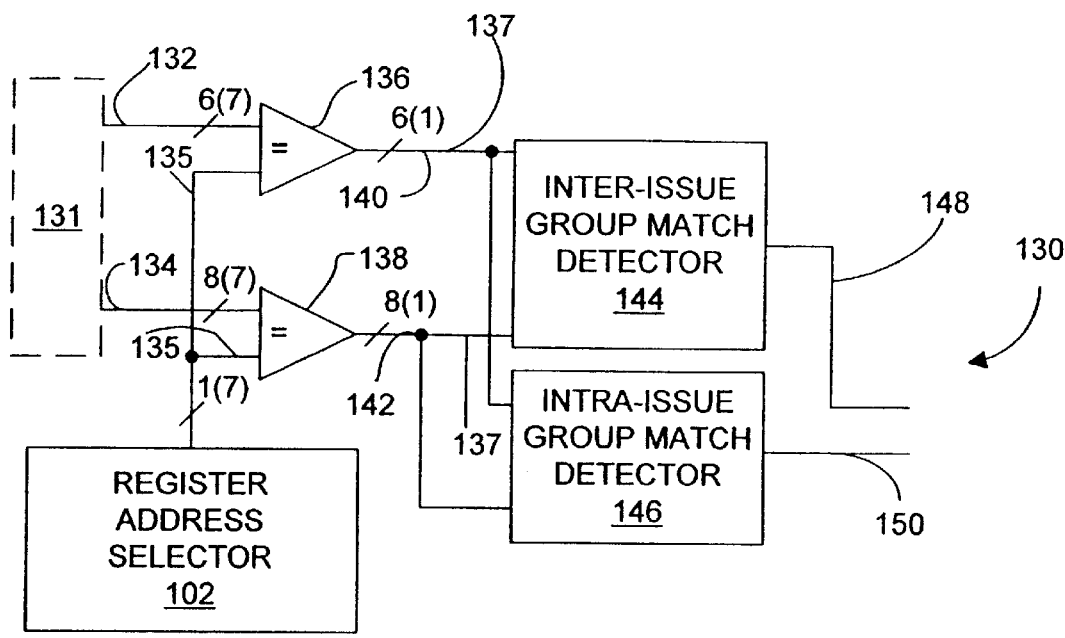
FIG. 4A is a high-level block diagram for an embodiment of the dependency detector of FIG. 1B that pseudo-randomly samples registers.

FIG. 4A illustrates one particular embodiment 130 of such a statistical dependency detector that statistically detects both intra-issue group and inter-issue group dependencies. In the dependency detector 130, registers (not shown) appearing as destination and source addresses of instructions have seven bit address identifiers. The issue group for the particular detector 130 includes instruction groups having six destination addresses and eight source addresses. Consequently, processor hardware 131 sends the destination addresses of one issue group to the input lines 132. The lines 132 consist of 6 bundles of 7 separate lines each. The 7 lines transmit individual bits of 7-bit destination addresses. Similarly, the processor hardware 131 sends the source addresses of one issue group to the input lines 134. The lines 134 consist of 8 bundles of 7 separate lines each, i.e., the separate lines transmitting individual bits of 7-bit addresses. However, the present invention is not so limited. Issue groups having different numbers of operand addresses and having different bit-sizes for addresses are also considered within the scope and spirit of the invention.

Still referring to FIG. 4A, the register address selector 102 of FIG. 4A provides a pseudo-randomly selected operand address, having 7 binary digits, to the first inputs 135 of the address comparators 136, 138. The address comparator 136 generates 6 signals that correspond to the 6 destination addresses of an issue group. For each destination address from the line 132 that matches the address from the register address selector 102, the address comparator 136 produces an output signal on line 137 having the value logic one on a corresponding one of the output lines 140. Similarly, for each operand address from the lines 134 that matches the address from the register address selector 102, the address comparator 138 produces an output signal having the value logic on a corresponding one of the lines 142. Otherwise, the output signal on the lines 137 has a logic value of zero. The statistical dependency detector 130 employs one address comparator 136, 138 per entering operand address and produces 1 digit logic signals in response to matches with respect to the pseudo-randomly selected operand address.

Still referring to FIG. 4A, the inter-issue group and intra-issue group match detectors 144, 146 produce logic signals on lines 148, 150 in response to matches between a pair of operand addresses from the lines 132, 134 and the address from the register address selector 102. In the various embodiments, the inter- and intra-issue group match detectors 144, 146 transmit one or more types of dependency information to the lines 148, 150. This transmitted dependency information is selected from the group consisting of particular operand addresses having matches, particular pairs of instructions having matches, latest ordered instructions of a pair having a match, and particular instruction groups having a match.

Figure 4B:
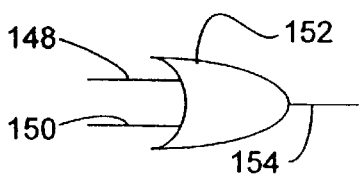
FIG. 4B is one embodiment of a hardware device for reporting dependencies detected by the detector of FIG. 4A.

FIG. 4B illustrates one hardware structure for transmitting information on dependencies detected by the detector 130 of FIG. 4A as may be employed in some embodiments thereof The specific embodiment of the detector 130 illustrated in FIGS. 4A and 4B includes an OR-gate 152 coupled to output lines 148, 150 from the inter- and intra- issue group match detectors 144, 146. The OR-gate 152 produces a signal having the value logic one in response to "the instruction group" having a dependency for the pseudo-randomly selected operand address. Otherwise, the Or-gate 152 outputs a signal having a value logic zero.

The dependency detector 130 of FIG. 4A may also be employed in conjunction with a scoreboard-type storage element in some embodiments. FIG. 4C illustrates a scoreboard storage structure 151 that may be employed for storing information on dependencies detected by the detector 130 of FIG. 4A. The scoreboard storage structure 151 stores logic signals for detected dependencies received from the output lines 148, 150 of the match detectors 144, 146. The memory cells of the scoreboard storage structure 151 are indexed by the order of the operands on the lines 132, 134. The row and column indices 153, 155 of the cell indicate the pair of operands from the lines 134, 132 for which the cell at that row and column position stores dependency data. The storage cells store a logic variable that indicates whether the corresponding pair of instructions is dependent (D) or not dependent (N). The scoreboard storage device 151 has 8 rows and 6 columns that correspond to the 8 and 6 operand positions on the line 134 and the line 132, respectively. By employing the scoreboard storage device 151, the dependency detector 130 of FIG. 4A can indicate particular pairs of operands/instructions which have encountered ordering dependencies.

Figure 4D:
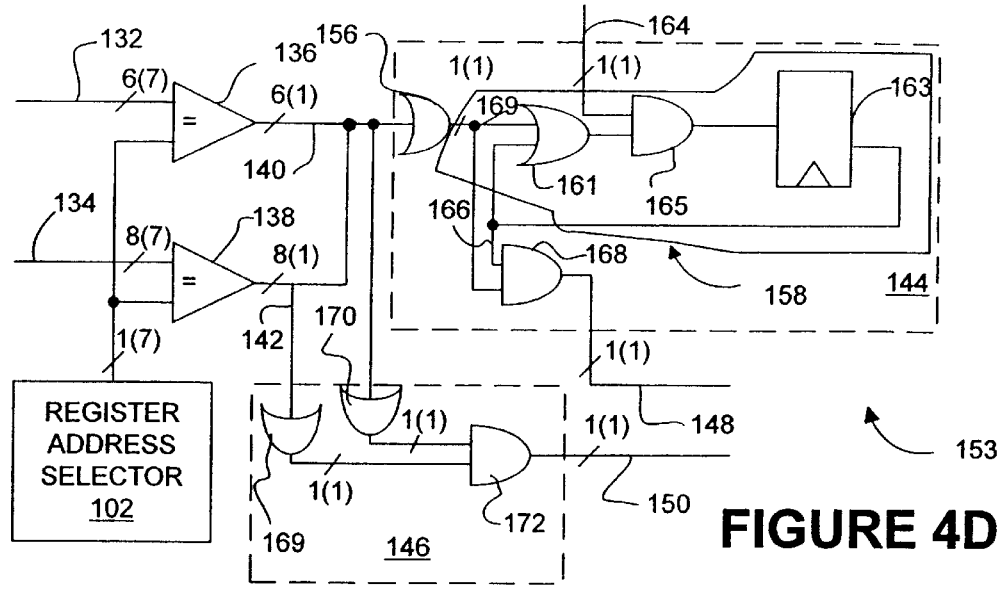
FIG. 4D is a circuit diagram for the dependency detector of FIG. 4A.
Figure 4C:
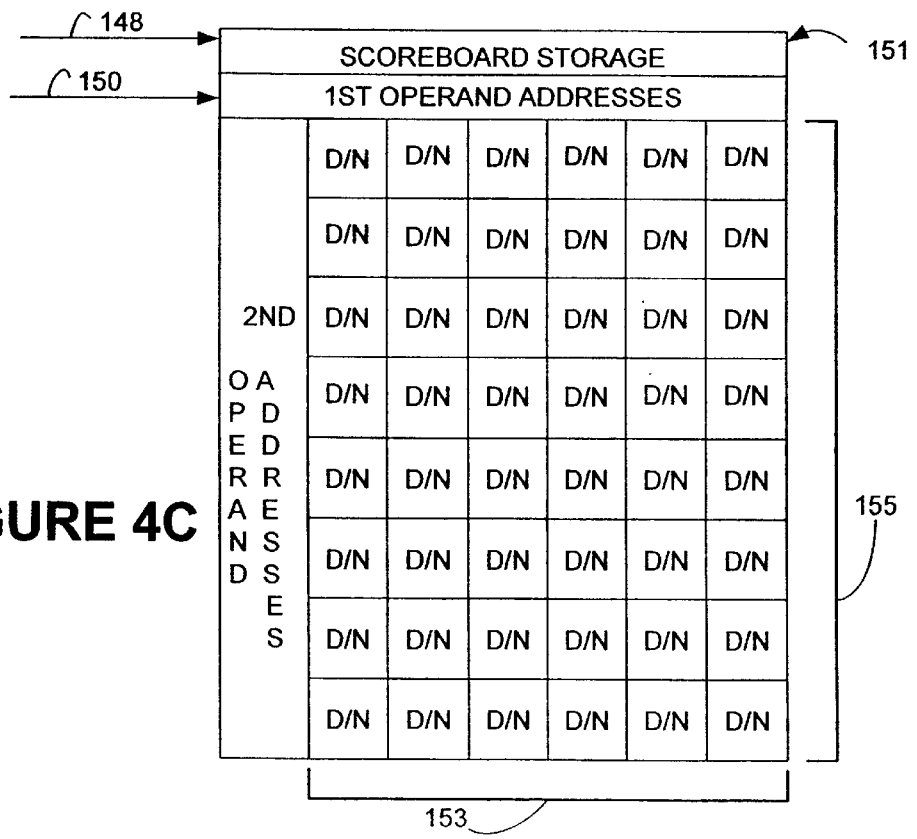
FIG. 4C is a second embodiment of a hardware device for reporting dependencies detected by the detector of FIG. 4A.

FIG. 4D is a circuit diagram 153 illustrating particular embodiments of both the inter- and intra-issue group match detectors 144, 146 of FIG. 4A in greater detail. In the inter-issue group match detector 144, an OR-gate 156 generates a 1-bit signal having value logic one in response to a signal from the address comparator 136 indicating a match between any of the six operand addresses of the lines 132 and the address from the operand address selector 102. The output from the OR-gate 156 connects to an input of a "sticky" storage device 158. An OR-gate 161 receives feedback signals from the register 163 and input signals from the OR-gate 156. An AND-gate 165 enables the use of external signals from the line 164 to reset the logic value stored in the sticky storage device 158. A register 163 in the sticky storage device 158 stores the output value from the AND gate 165. An AND-gate 168 receives logic signals from an output line 166 from the sticky storage device 158 and an output line 169 from the OR-gate 156. The AND-gate 168 generates a signal having value logic one on output line 148 in response to a match between the logic signals on the lines 166, 169. Thus, the inter-issue group match detector 144 produces an output signal of logic one in response to any destination address of the issue group matching the address from the operand address selector 102.

Still referring to FIG. 4D, the storage device 158 is sticky, because the output signal from the line 166 remains fixed after changing to logic one. An external controller (not shown) may apply to signal of logic zero to the line 164 to reset the sticky storage device 158 to logic zero in preparation for the arrival of a new instruction group. The output line 166 of the sticky storage device 158 transmits the value logic one, one clock cycle after the first match between one of the operand addresses from the line 132 and the operand address from the register address selector 102. Thus, the output logic signal on the line 166 changes values almost simultaneously with the arrival of the issue group following an issue group having a destination address that matches the selected register address. The AND-gate 168 produces a signal with the value logic one in response to an inter-issue group dependency for the particular address selected by the register selector 102.

FIG. 4D also illustrates one embodiment for the intra-issue group match detector 146. The OR-gate 169 and the OR-gate 170 produce 1-bit signals having the value of logic one in response to any operand address from both the line 134 and the line 132 matching the address from the register address selector 102. The output terminals of the OR-gates 169, 170 couple to inputs of an AND-gate 172. The AND-gate 172 produces a signal having the value logic one in response to a dependency between operand addresses received on the lines 132 and the lines 134, providing that the matching operand addresses also match the address from the register address selector 102. Thus, the intra-issue group dependency detector 146 produces a logic signal to indicate matches between operand addresses within the same issue group, wherein the operand addresses also match the address selected by the register address selector 102.

Still referring to FIGS. 4A and 4D, the AND-gates 168, 172 transmit logic signals for inter-issue and intra-issue group dependencies to the lines 148, 150 in FIG. 4A. Since the dependency detector 130 only detects dependencies of instructions with operand addresses matching the pseudo-randomly selected registers, fewer of the large address comparators 136, 138 are used. For example, the number of address comparators 22, 24, 26 in the scoreboard detector 20 of FIG. 2 equals the number of permutations of operand addresses to be compared. While the number of address comparators 136, 138 in the dependency detector 130 equals the number of "operand addresses" to be compared. The dependency detector 130 employs AND-gates 168, 172 to carry out comparisons among operand addresses of different instructions by using "1-digit binary signals" as opposed to the "multiple digit addresses" used for comparisons in the scoreboard detector 20 of FIG. 2. Since the number of "pairs of operand addresses" is usually significantly larger than the number of "operand addresses," reducing the number of address comparators may save substantial space on the chip surface. For processors handling large instruction groups, the dependency detector 130 and the match detectors 144, 146 of FIGS. 4A and 4D may occupy substantially less space on a chip surface than the scoreboard detector 20 of FIG. 2.

Figure 4E:
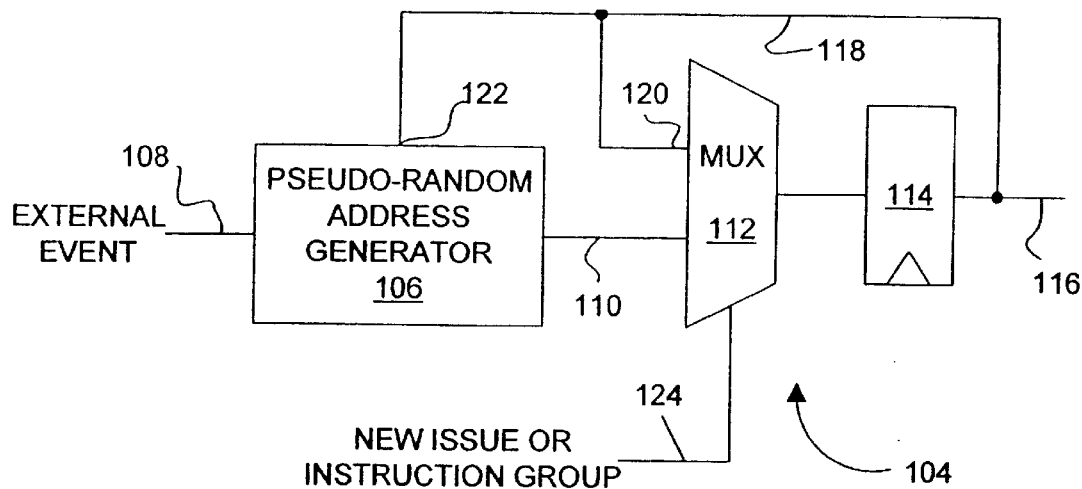
FIG. 4E is a circuit diagram for one embodiment of the operand address selector employed by the dependency detectors of FIGS. 4A and 4D.

FIG. 4E illustrates one embodiment 104 of the register address selector 102 of FIGS. 4A and 4D. The register address selector 104 includes a pseudo-random address generator 106, which is triggered by a external event signal on the line 108. A line 110 transmits the address from the pseudo-random address generator 106 to a multiplexer (MUX) 112. The MUX 112 sends an output operand address to a storage register 114. The storage register 114 sends the operand address to an output terminal 116 and to a feedback loop 118. The feedback loop 118 couples to a second input terminal 120 of the MUX 112 and to a second input 122 of the pseudo-random address generator 106. The feedback loop 118 insures that the register address selector 104 generates the same register address until a signal on the select terminal 124 of the MUX 112 selects a newly generated address from the pseudo-random address generator 106.

Figure 4F:
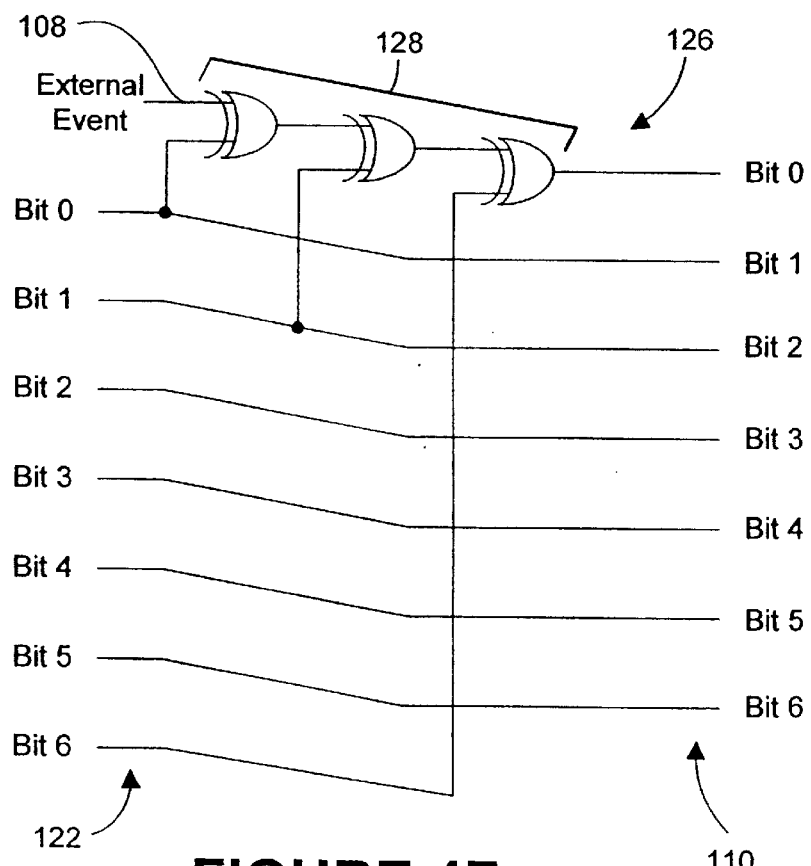
FIG. 4F is a circuit diagram for one embodiment of the pseudo-random address generator employed by the operand address selector of FIG. 4E.

FIG. 4F illustrates an embodiment 126 of the pseudo-random address generator 106 of FIG. 4E, which generates pseudo-random 7-bit operand addresses. The input lines 122 transmit the last-stored 7-bit address signal from the storage register 114 to the pseudo-random address generator 126. The pseudo-random address generator 126 shifts Bits 0 to 5 of the signal from the line 122 down by one bit. Thus, new Bit "i" of line 110 is old Bit "i−1" of the line 122, i.e., i=1, 2, . . . 6. In the various embodiments, an external event signal from the line 108 is a 1-digit binary signal and may be pseudo-randomly generated. A first input of a series of exclusive OR-gates 128 receives the external event signal. Second inputs of the exclusive OR-gates 128 receive feedback signals of values of old Bits 0 to 6 from the line 122. The output signal from the exclusive OR-gates 128 is the new Bit 0 transmitted to the output line 110.

Still referring to FIG. 4F, the pseudo-random address generator 126 combines the external event signal from the line 108 and the series of exclusive OR-gates 128 with feedback from the lines 122 to produce a pseudo-random output Bit 0 on the line 110. The pseudo-random address generator 126 shifts the bits of the lines 122 down by feeding the pseudo-random choices for Bit 0 to Bits 1 to 6 in response to signals from line 124 triggering new address selections. The invention is not however, limited to the specific embodiments 104, 126 of FIGS. 4E and 4F for pseudo-randomly selecting operand addresses. Rather, the invention covers all methods and apparatus for generating and selecting addresses, including but not restricted to pseudo-random generators, adders, or implementors that would be known to a person of skill in the art in light of the present disclosure.

Figure 5A:
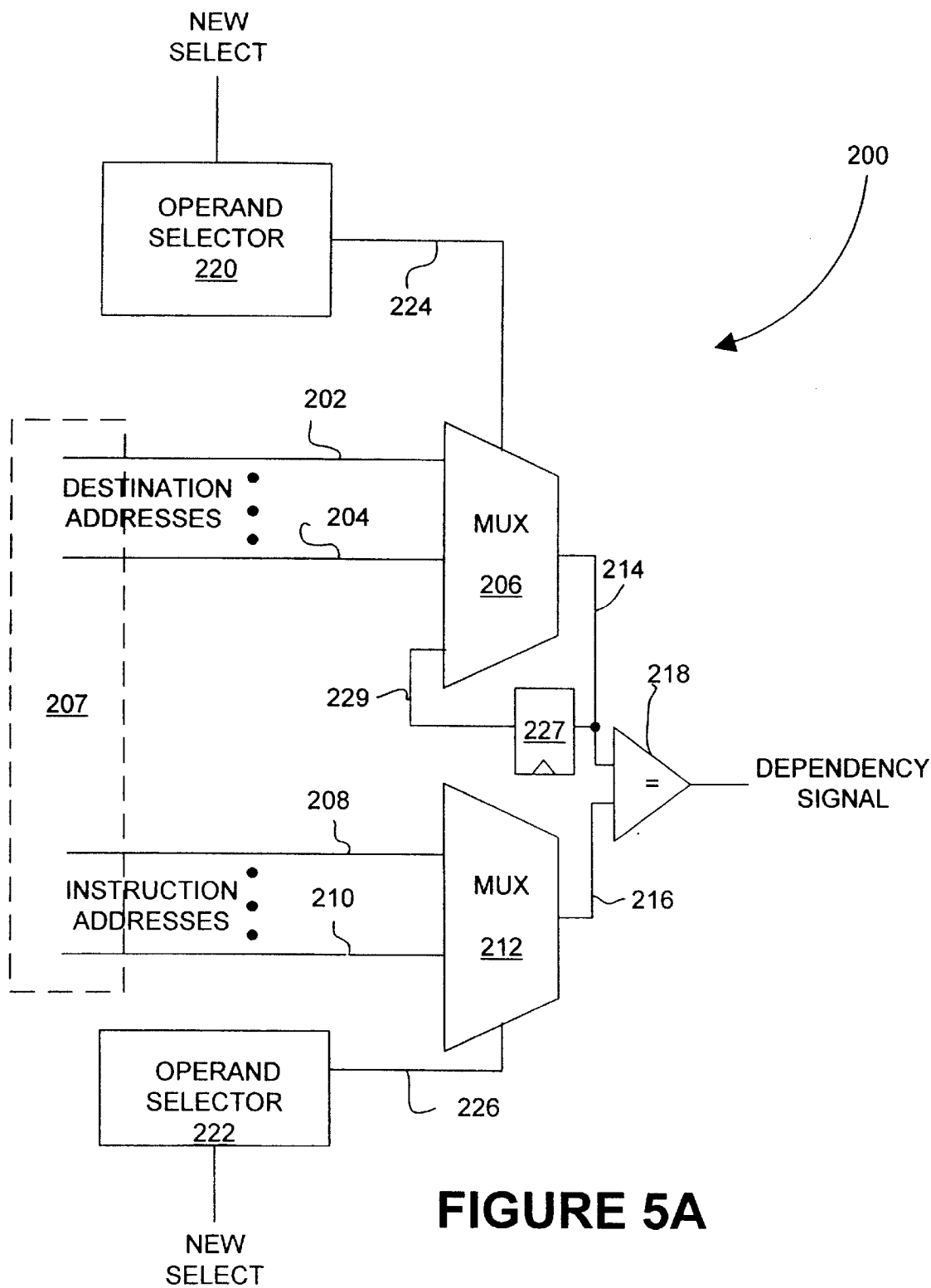
FIG. 5A is a high-level block diagram for one embodiment of a dependency detector that employs sampling of operand of instructions to statistically detect instruction dependencies between different issue groups.

FIG. 5A illustrates a high-level block diagram of a particular embodiment of a dependency detector 200 that employs operand sampling to statistically detect inter-issue group dependencies. Lines 202, 204 transmit destination addresses of the instructions from processor hardware 207 to data inputs of a first multiplexer (MUX) 206. Lines 208, 210 transmit operand addresses of the instructions of a second and later issue group from the processor hardware 207 to data inputs of a second MUX 212. In embodiments for detecting WAW dependencies and RAW dependencies, the operand addresses on lines 208, 210 are destination and source addresses, respectively. The MUXs 206, 212 select the operands from the inputs thereof for detection of dependencies. The MUXs 206, 212 transmit the addresses of the selected operands to output lines 214, 216 that connect to the inputs of a single address comparator 218. The address comparator 218 produces a signal for a dependency having a value of logic one in response to a match between the addresses from the lines 214, 216. A register 227 stores addresses transmitted by the MUX 206 and transmits the stored addresses to data inputs 229 of the MUX 206 so that the dependency detector 200 can detect matches with operand addresses of any earlier issue group. In response to a new select signal for a new issue group, operand selectors 220, 222 transmit pseudo-random selections for operands to select inputs of the MUXs 206,212.

Figure 5B:
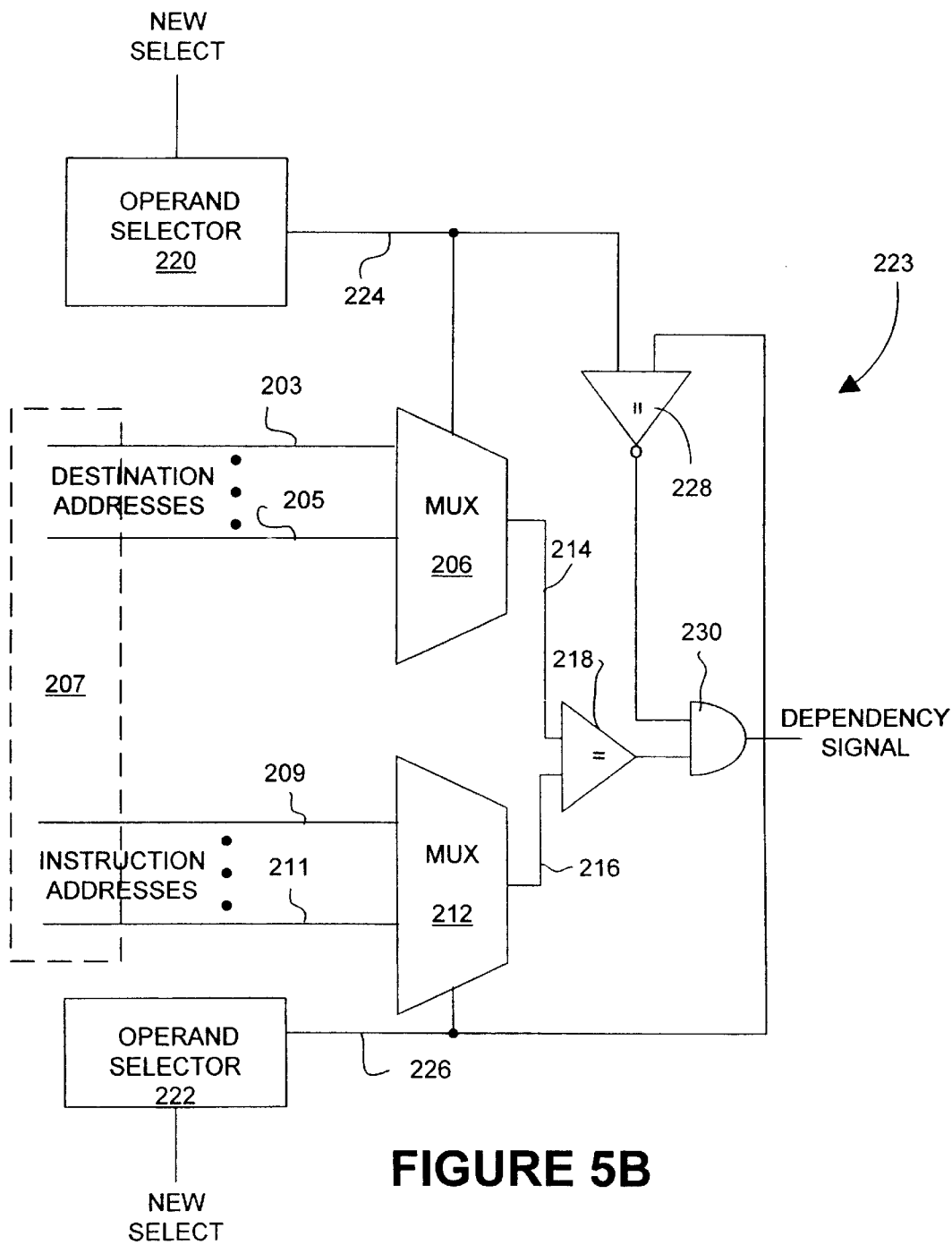
FIG. 5B is a high-level block diagram for one embodiment of a dependency detector that employs instruction sampling of operands to statistically detect group dependencies within one issue group.

FIG. 5B is a high-level block diagram of an alternate embodiment of the dependency detector 200 of FIG. 5A. As illustrated in FIG. 5B, dependency detector 223 statistically sample operands to detect intra-issue group dependencies. Here, lines 203, 205 and lines 209, 211 transmit operand addresses of instructions from processor hardware 207 to data inputs of the first and second MUX 212, respectively. In embodiments for detecting WAW and RAW dependencies, the operand addresses on lines 209, 211 are instruction destination and source addresses, respectively, of the same issue group as the operand addresses received from the lines 203, 204. In embodiments for detecting WAW dependencies and RAW dependencies, the operand select signals from the operand selectors 220, 222 may include first and second portions to select both an instruction in an issue group and a particular operand address in the instruction, respectively. The first and second operand selectors 220, 222 transmit the whole operand select signals to select inputs of the MUXs 206, 202 by lines 224, 226. In embodiments for detecting intra-issue group dependencies, the operand address selectors 220, 222 also transmit the portion of the operand select signals for selecting the particular instruction to inputs of a second comparator 228. The comparator 228 produces a signal of logic zero in response to the two operand address selectors 220, 222 selecting the same instruction. The output logic signals from the first and second comparators 218, 228 go to inputs of an AND-gate 230. The AND-gate 230 transmits a signal for a dependency in response to the matching addresses being from different instructions.

Figure 6A:
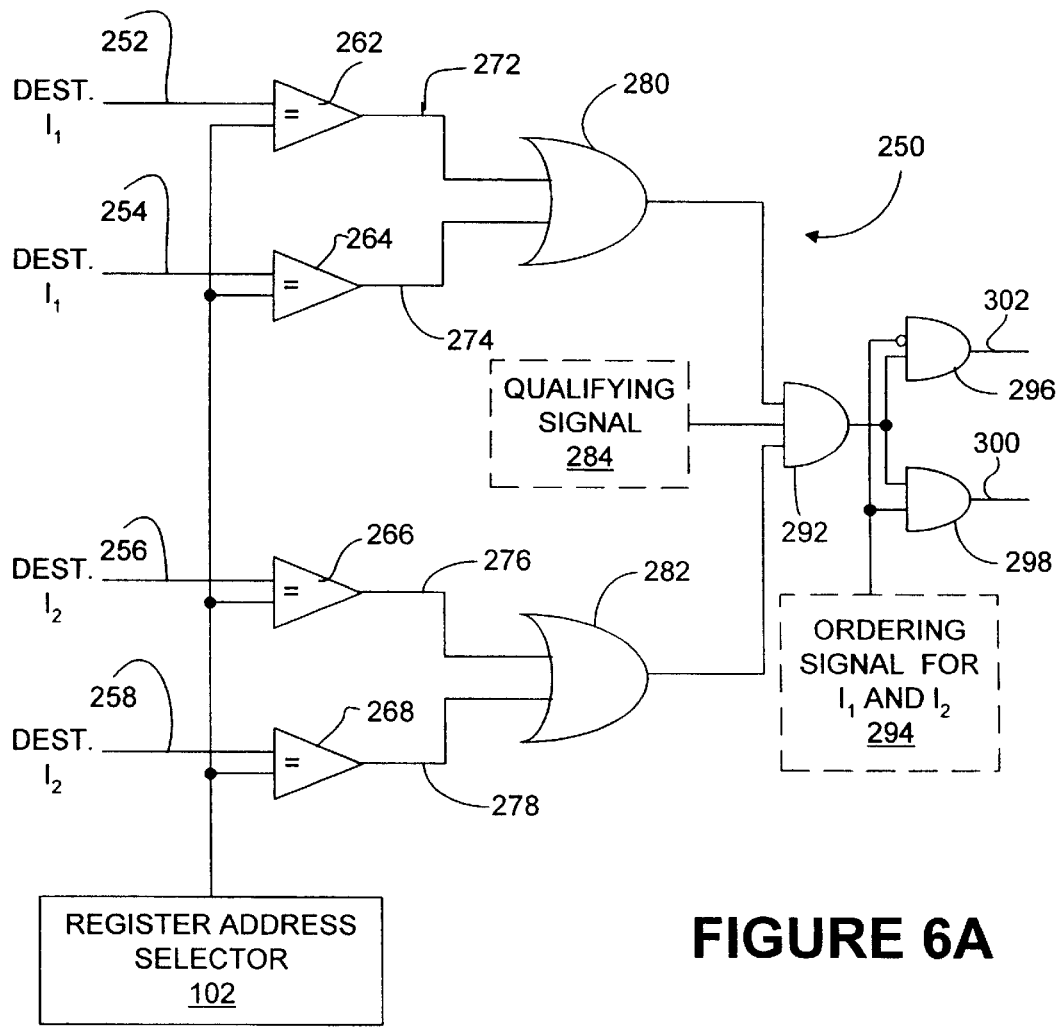
FIG. 6A is a circuit diagram illustrating one embodiment of a detector of intra-issue group WAW dependencies on selected instruction types.

FIG. 6A illustrates a particular embodiment for a portion of a dependency detector 250 for intra-issue group WAW dependencies between instructions having two destination operands each. First input lines 252, 254 and second input lines 256, 258 receive destination addresses from first and second instructions, respectively. The input lines 252, 254, 256, 258 connect to first inputs of address comparators 262, 264, 266, 268. The register address selector 102 couples to second inputs of the address comparators 262, 264, 266, 268 so that the address comparators 262, 264, 266, 268 compare the destination addresses of instructions to a pseudo-randomly selected operand address. The address comparators 262, 264, 266, 268 produce logic signals on output lines 272, 274, 276, 278 responsive to matches between the corresponding incoming destination address and the pseudo-randomly selected operand address. OR-gates 280, 282 combine the logic signals from the pairs of address comparators 262, 264, 266, 268 for the same instruction to produce an overall logic signal indicating whether any of the destination addresses of one instruction match the address from the register address selector 102. The OR-gates 280, 282 transmit output logic signals to an AND-gate 292 that corresponds to a particular pair of instructions being compared for WAW dependencies.

Still referring to FIG. 6A, the AND-gate 292 also includes a third input terminal for a "qualifying logic signal" 284. The qualifying signal 284 depends on the particular instruction pair and serves to enable the selective detection of subsets of all WAW dependencies. For example, some WAW dependencies between instruction pairs may be allowed by hardware constraints. For such instruction pairs the qualifying signal 284 would have the value of logic zero so that associated WAW's would not be detected. The AND-gate 292 produces a signal of logic one in response to the logic signals from the associated pair of OR-gates 280, 282 indicating a WAW dependence and the qualifying signal 284 indicating a selected or qualified instruction pair.

Still referring to FIG. 6A, the logic signal from the AND-gate 292 goes to inputs of a pair of AND-gates 296, 298. The second inputs of the AND-gates 296, 298 receive conjugated forms of "an ordering" logic signal that indicates which instruction of the dependent pair is earlier and which instruction is later. The AND-gates 296, 298 are connect so that only one output line 300, 302 transmits a logic signal for indicating a "qualifying" WAW dependency. The pair of AND-gates 296, 298 enable producing output logic signals that associate detected WAW dependencies to the later instruction of the dependent pair.

In some embodiments (not shown) of the detector 250 of FIG. 6A, each output line 272, 274, 276, 278 includes an AND-gate. A first input of each of the AND-gates (not shown) couples to one end of the associated output line 272, 274, 276, 278, and an external line couples to a second input of each of the AND-gates. The outputs of the AND-gates (not shown) couple the lines 272, 274, 276, 278 to the OR-gates 280, 282. These AND-gates (not shown) allow disabling outputs from the address comparators 262, 264, 266, 268 with an external signal, if an operand or an instruction is invalid.

Figure 6B:
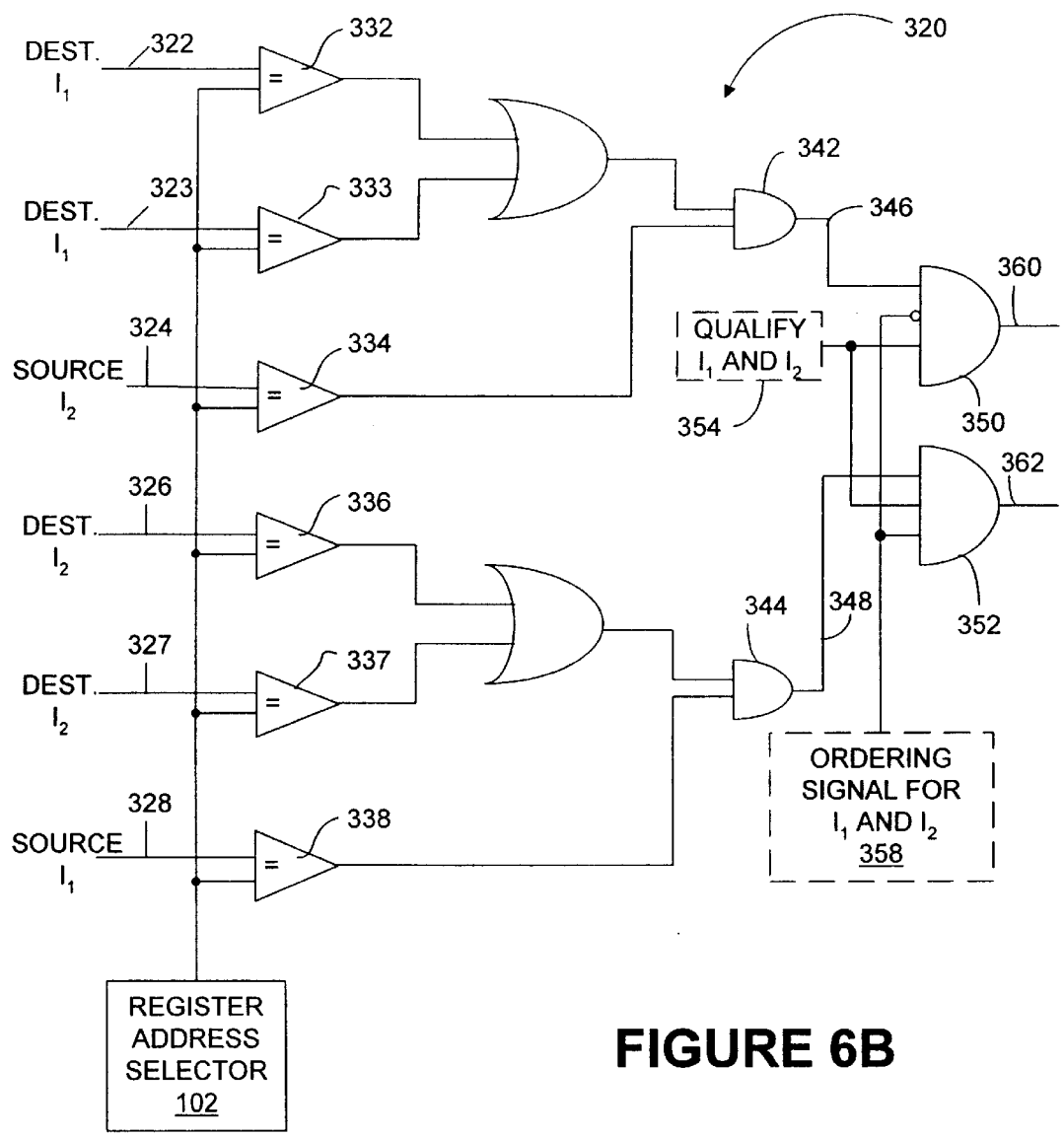
FIG. 6B is a circuit diagram illustrating one embodiment of a detector of intra-issue group RAW dependencies on selected instruction types.

FIG. 6B illustrates a particular embodiment for a portion of a dependency detector 320 for intra-issue group RAW dependencies in instructions having two destination addresses and one source address. From lines 322, 323, 324, 326, 327, 328, address comparators 332, 333, 334, 336, 337, 338 receive the destination and source addresses from two instructions, i.e., $I_1$ and $I_2$, for comparison with a operand address from the random address generator 102. The address comparators 332, 333, 334, 336, 337, 338 transmit a signal having the value of logic one in response to the incoming operand address matching the selected operand address. A pair of AND-gates 342, 344 are associated with each pair of instructions under consideration. The members of the pair correspond to the two groupings of the sources address of one instruction with the destination addresses of the other instruction. First and second inputs of the AND-gates 342, 344 receive "logic signals" indicating matches between source and destination addresses of the two instructions and the operand address from the operand address selector 102. The AND-gates 342, 344 generate signals having the value of logic one in response to matches between source and destination addresses of the pair and the pseudo-randomly selected operand address.

Still referring to FIG. 6B, the pair of AND gates 342, 344 connect to a pair of AND-gates 350, 352 that enable the detection of dependencies to be limited to selected instruction pairs. The AND-gates 350, 352 receive "qualifying logic signals" 354 that enable the output lines 360, 362 to transmit dependency signals if dependencies are between selected types of instructions. The AND-gates 350, 352 also receive an instruction ordering signal 358 that assures that the output line 360, 362 transmitting a logic signal for a dependency is associated with the sequentially later of the two instructions under consideration, ie., $I_1$ or $I_2$.

Referring to FIGS. 6A and 6B, the dependency detectors 250, 320 include one address comparator 252, 254, 256, 258, 332–334, 336–338 for each operand address in the issue group under consideration. The address comparators 262, 264, 266, 268, 332–334, 336–338 produce 1-bit logic signals and transmit the logic signals to an AND-gate 292, 342, 344 for the detection of matches between the associated pair of instructions. Thus, the intra-issue group dependency detectors 250, 320 include one or two AND-gates 292, 342, 344 per "pair" of instructions and only three address comparators 252, 254, 256, 258, 332–334, 336–338 per "instruction."

Referring to FIGS. 6A and 6B, the dependency detectors 250, 320 usually employ fewer address comparators than the scoreboard detector 20 of FIG. 2. While the scoreboard detector 20 use one address comparator 22, 24, 26 "per pair" of operand addresses to be compared, the dependency detectors 250, 320 employ two or three address comparators 252, 254, 256, 258, 322–324, 326–328 "per operand." The dependency detectors 250, 320 employ the AND-gates 292, 342, 344 to check for matches between "pairs of instructions." Since address comparators are ordinarily more complex structures than AND-gates, the replacement of address comparators by AND-gates ordinarily reduces the amount of hardware used for dependency checking. In many embodiments, the dependency detectors 250, 320 of FIGS. 6A and 6B use less hardware than the score board device 20 of FIG. 2, because of a reduction in the number of large address comparators.

Figure 6C:
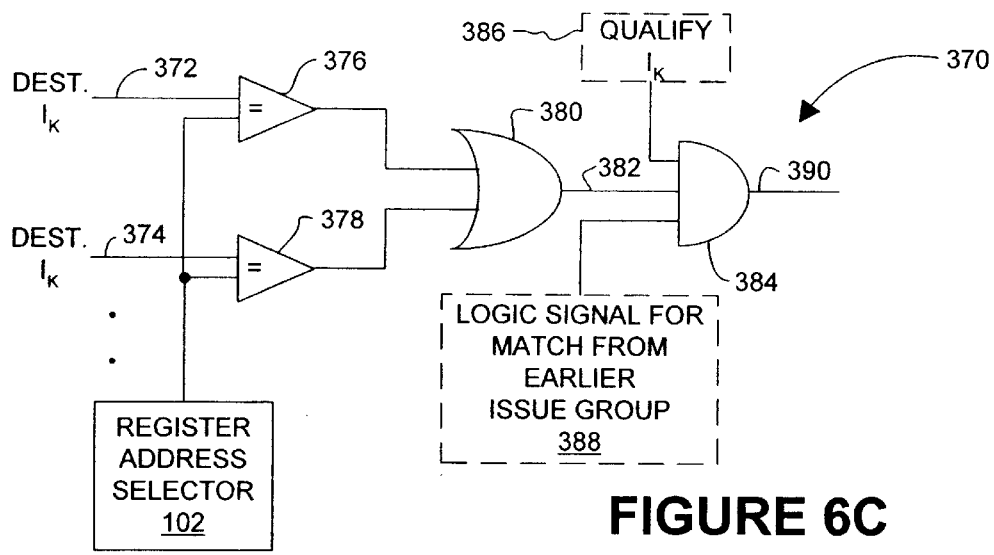
FIG. 6C is a circuit diagram illustrating one embodiment of a detector of inter-issue group WAW dependencies on selected instruction types.

FIG. 6C illustrates one embodiment of a dependency detector 370 for inter-issue group WAW dependencies for instructions having two destination addresses. First input lines 372, 374 transmit destination addresses of an instruction from the issue group under consideration to first input terminals of an address comparator 376, 378. The second input lines transmit a pseudo-randomly selected address from the register address selector 102 to the address comparators 376, 378. There is one address comparator 376, 378 for each destination address in the issue group. The address comparators 376, 378 produce a signal having a value of logic one in response to a match between the corresponding destination address and the address from the register address selector 102. An OR-gate 380 receives the logic signals from the address comparators 376, 378 and produces a signal having the value of logic one in response to any of the corresponding address comparators 376, 378 registering a match. An AND-gate 384 receives logic signals from the OR-gate 382, a destination address of an earlier issue group 388, and a qualifying control 386. The qualifying control 386 determines whether the instruction is of a type selected for the detection of dependencies. If the instruction is selected by the qualifying signal 386 and the logic signals from the OR-gate 380 and the destination address of an earlier issue group 388 match, the AND-gate 384 generators a signal having a value of logic one on output line 390. Thus, the AND-gate 384 transmits a signal having a value of logic one if both the destination address from a "qualified" instruction and from an instruction in an earlier issue group match the address from the operand address selector 102.

Figure 6D:
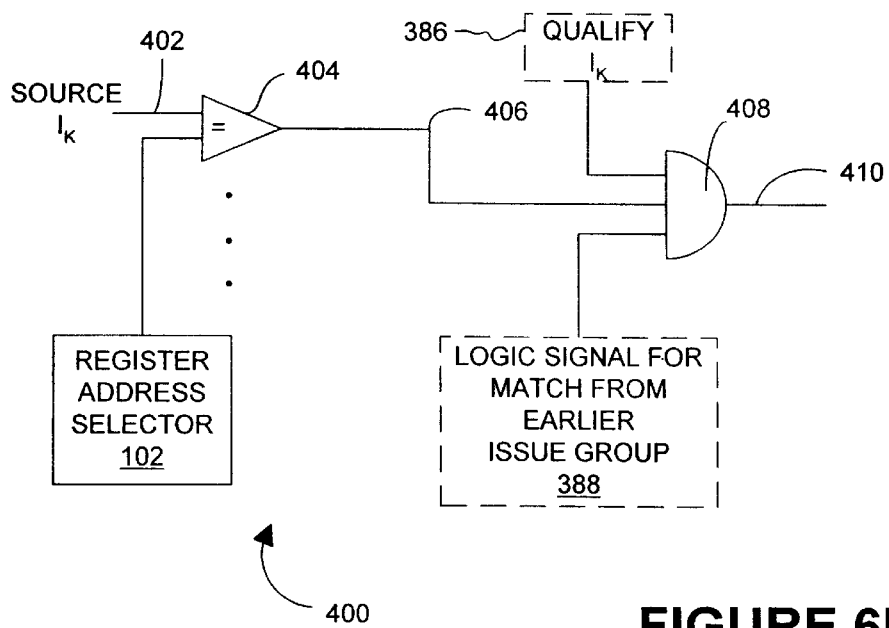
FIG. 6D is a circuit diagram illustrating one embodiment of a detector of inter-issue group RAW dependencies on selected instruction types.

FIG. 6D illustrates an embodiment 400 of a dependency detector for inter-issue group RAW dependencies for selected instruction types. A line 402 transmits a source address to a first input terminal of an associated address comparator 404. The second input of the address comparator 404 receives a pseudo-randomly selected address from the operand address selector 102. The address comparator 404 transmits a logic signal having a value of logic one to output line 406 in response to a match between the source address from the line 402 and the address from the register address selector 102. An AND-gate 408 receives the logic signal from the line 406, the qualifying signal 386 for instruction selection, and a signal for a match between a destination address of an earlier issue group and the address from the register address selector 102. Instructions may be qualified or selected by instruction type, validity of operand addresses, and executability. The AND-gate 408 produces a signal on the output line 410 of value logic one in response to both the source address of the selected instruction and the destination address of the instruction of an earlier issue group matching the address from the register address selector 102. Thus the dependency detector 400 detects RAW dependencies, a destination address of an earlier issue group and a source address of a selected type of instruction of the present issue group match the pseudo-randomly selected operand address.

Referring to FIGS. 6C and 6D, the inter-issue group dependency detectors 370, 400 employ one address comparator 372, 374, 404 for each operand address of the issue group under consideration. For large issue groups, the dependency detectors 370, 400 employ less address comparators than the scoreboard detector 20 of FIG. 2. Instead of using one address comparator per instruction "operand," like in the scoreboard detector 20 of FIG. 2, the detectors 370, 400 use one AND-gate 384, 408 per instruction pair. Since AND-gates are usually substantially smaller than address comparators the inter-issue group dependency detectors 370, 400 may employ substantially less hardware for detecting dependencies.

Figure 7A:
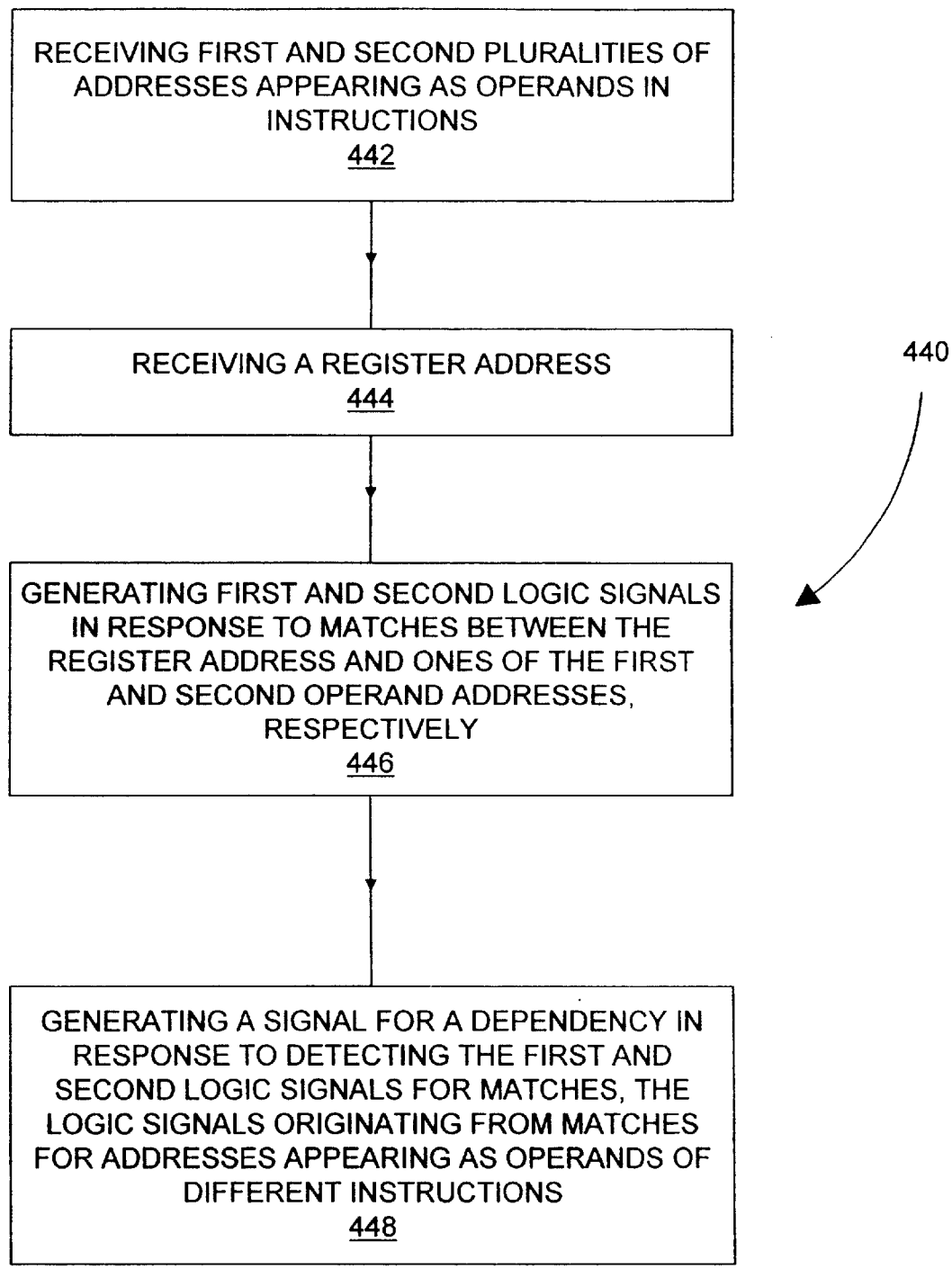
FIG. 7A is a flowchart illustrating a method for statistically detecting dependencies by pseudo-randomly selecting operand addresses.

FIG. 7A is a flowchart illustrating an embodiment 440 of a method for detecting dependencies by pseudo-randomly selecting register addresses for comparison with pluralities of first and second operand addresses. At block 442, first input lines of a plurality of address comparators receive the pluralities of first and second operand addresses. For example, input lines 132 and 134 of the address comparators 136, 138 of FIGS. 4A and 4D receive first and second operand addresses. At block 444, second input lines of the plurality of the address comparators receive a pseudo-randomly selected register address. For example, the address comparators. 136, 138 of FIGS. 4A and 4B receive a pseudo-randomly selected register address on second input lines from the register address selector 102 of FIGS. 4A and 4B. At block 446, the address comparators generate first and second logic signals in response to detecting matches between the selected register address and the first and the second operand addresses, respectively. In FIGS. 4A and 4B, the first and second logic signals are generated on the line 140 and the line 142, respectively. At block 448, a hardware structure generates a signal for a dependency in response to detecting the first and second logic signals for matches. For example, the inter- and intra- issue group match detectors 144, 146 are hardware structures that generate signals for dependencies in response to detecting first and second logic signals for matches on the lines 140, 142. A signal for a dependency is generated if the detected logic signals correspond to the matches for operand addresses of different instructions.

Figure 7B:
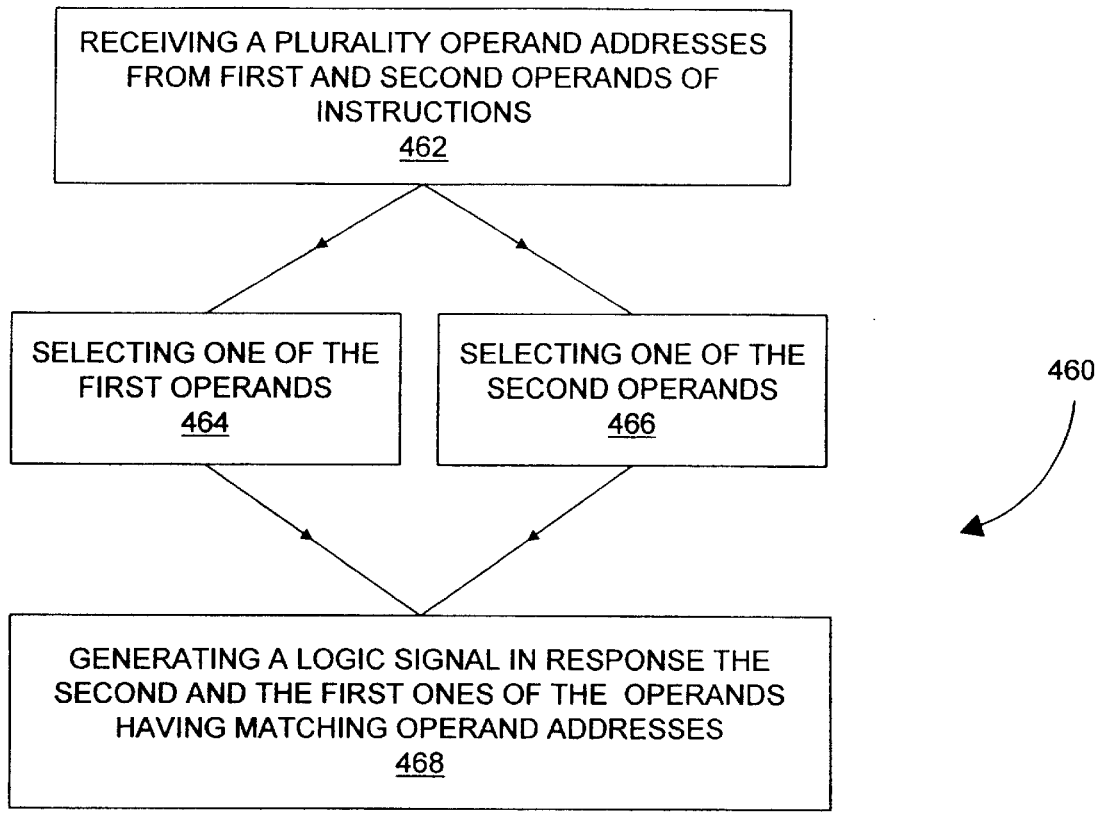
FIG. 7B is a flowchart illustrating a method for statistically detecting dependencies by pseudo-randomly selecting operands.

FIG. 7B is a flowchart illustrating an embodiment 460 of a method for detecting dependencies by pseudo-randomly selecting first and second operands of instructions. At block 462, input lines of a first and second multiplexer, e.g., the MUXs 206, 212 of FIGS. 5A and 5B, receive a plurality of first and second operand addresses from a portion of an instruction group. At block 464, the first multiplexer, e.g., the MUX 206 of FIGS. 5A and 5B, selects one of the first operands in response to a signal applied to a select input terminal thereof. At block 466, the second multiplexer, e.g., the MUX 212 of FIGS. 5A and 5B, selects one of the second operands in response to a signal applied to a select input terminal of the second multiplexer. At block 468, an address comparator, e.g., the address comparator 218 of FIGS. 5A and 5B, generates a logic signal for an instruction dependency in response to determining that the selected first and second operands have matching addresses. The method 460 detects a dependency if a match occurs for selected operand addresses of different instructions.

Referring to FIGS. 7A and 7B, the second operand addresses can be destination and/or source addresses of the same and/or different issue groups as the first operand addresses. The first operand addresses are destination addresses of instructions. In some embodiments, the first and second operand addresses are from the same issue group and/or are both destination addresses. In the various embodiments, the first and second operand addresses come from instructions belonging to the same hardware-defined "instruction group."

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus for detecting instruction dependencies, comprising:
   a first multiplexer having first select inputs and first data inputs, the first data inputs to receive a first set of operand addresses;
   a second multiplexer having second select inputs and second data inputs, the second data inputs to receive a second set of operand addresses;
   an address comparator having first and second inputs and being coupled to receive output data signals from the first and second multiplexers on the first and second inputs; and
   a hardware structure to select operand addresses, and output of the hardware structure being coupled to the first and second select inputs.

2. The apparatus as set forth in claim 1, wherein the hardware structure to select operand addresses is adapted to pseudo-randomly select operand addresses.

3. The apparatus as set forth in claim 1, further comprising a hardware structure to transmit operand addresses of instructions of first and second issue groups to the data inputs of the first and second multiplexers, respectively.

4. The apparatus as set forth in claim 1, further comprising:
   a storage structure adapted to store addresses transmitted by the first multiplexer; and
   a feedback loop to transmit the addresses stored in the storage structure to a portion of the data inputs of the first multiplexer; and
   wherein the hardware structure to select operand addresses is capable of selecting addresses from the portion of the data inputs of the first multiplexer.

5. A method for detecting instruction dependencies, comprising:
   receiving first and second pluralities of operand addresses corresponding to first and second pluralities of operands of instructions;
   selecting a register addresss;
   generating first and second logic signals in response to matches between the register address and ones of the first and second pluralities of operand addresses, respectively; and
   generating a signal for a dependency in response to the first and second logic signals originating from matches for the operands of different instructions.

6. The method as set forth in claim 5, wherein the first plurality of operand addresses are destination addresses and the second plurality of operand addresses are sources addresses.

7. The method as set forth in claim 5, wherein the first and second pluralities of operand addresses are destination addresses.

8. The method as set forth in claim 5, wherein the first and second pluralities of operands belong to different issue groups of instructions.

9. The method as set forth in claim 5, wherein the first and second pluralities of operands belong to instructions of the same instruction group.

10. The method as set forth in claim 5, wherein the act of selecting the register address is pseudo-random.

11. A method for detecting instruction dependencies, comprising:

receiving first and second pluralities of operand addresses corresponding to first and second pluralities of operands of instructions;
    selecting one of the first plurality of operands, the one of the first plurality of operands having an associated first register address and being a destination operand of a first instruction;
    selecting one of the second plurality of operands, the one of the second plurality of operands having an associated second register address; and
    generating a logic signal for a dependency in response to the first and second register addresses matching, and the ones of the first and second pluralities of operands being operands from different instructions.

12. The method as set forth in claim 11, wherein the acts of selecting one of the second operand addresses includes selecting the one of the second plurality of operands from a different issue group of instructions than the act of selecting one of the first plurality of operands.

13. The method as set forth in claim 11, wherein the one of the second addresses is a destination address of a second instruction.

14. The method as set forth in claim 11, wherein the acts of selecting the operands is pseudo-random.

15. An apparatus, comprising:
    a generating hardware structure to generate a sequence of instructions, the instructions including at least two operand addresses, wherein at least one of the at least two operand addresses is a source address; and
    a dependency detector coupled to the hardware structure to select a plurality of instruction groups, the instruction groups to include a plurality of randomly chosen consecutive instructions, the dependency detector to compare at least one first instruction operand address to a subset of register values equal to less than all register address values available; and
    the dependency detector to exclude one or more instructions' operand sources or destinations included in the plurality of groups excludes one or more operand sources and operand destinations of the instructions included in the sequence of instructions to compare to register address values available.

16. The apparatus as set forth in claim 15, wherein the at least one second operand address's one of the sequence of instructions is consecutive with the one of the sequence of instructions that provides the first operand address.

17. The apparatus as set forth in claim 15, wherein the at least one second operand address is a register address.

18. The apparatus as set forth in claim 15, wherein the dependency detector further comprises a plurality of address comparators having pluralities of first and second inputs, the first and second inputs to receive operand addresses from the instructions, the address comparators to have at least one output to transmit a logic signal responsive to a match of operand addresses.

19. The apparatus as set forth in claim 15, wherein the generating hardware structure sends a destination address to the dependency detector.

20. The apparatus as set forth in claim 19, wherein the generating hardware structure is coupled to transmit operand addresses of instructions from different issue groups to the dependency detector.

21. The apparatus as set forth in claim 19, wherein the generating hardware structure is coupled to transmit operand addresses of instructions from the same issue group to the dependency detector.

22. The apparatus as set forth in claim 15, further comprising:
   a destination generating hardware structure coupled to send a destination address to the dependency detector ucture.

23. The apparatus as set forth in claim 15, wherein the generating hardware structure comprises:
   an analyzing hardware structure comprising a first detector coupled to receive a first logic signal and a second detector coupled to receive a second logic signal, the dependency detector further comprising a first output to produce the first logic signal responsive to the comparisons of the at least one operand address to the subset of at least one second operand address and a second output to produce the second logic signal responsive to the comparisons of the at least one operand address to the subset of at least one second operand address.

24. The apparatus as set forth in claim 23, wherein the sequence of instructions are in a single issue group.

25. The apparatus as set forth in claim 23, wherein the sequence of instructions are in different issue groups.

26. The apparatus as set forth in claim 23, wherein the sequence of instructions are a comparison state vector of prior issue group destination addresses, stored in an accumulation register, the accumulation register to signal a new issue group's beginning.

27. The apparatus as set forth in claim 23, the first and second detectors to produce a third and fourth respective logic signal into a logical OR gate.

28. The apparatus as set forth in claim 23, the first and second detectors to produce a third and fourth respective logic signal into a scoreboard storage to store instruction pair dependencies.

29. The apparatus as set forth in claim 15, further comprising a scoreboard storage device having a write port, the write port to receive logic signals from the detector, the logic signals responsive to the comparisons of the at least one operand address to the subset of at least one second operand address.

30. The apparatus as set forth in claim 15, wherein the detector further comprises:
   a sticky storage device coupled to receive received logic signals from the generating hardware structure and to output a stored logic signal; and
   a logic gate coupled to receive the stored logic signal and an operand address and to produce the signal for a dependency in response a match between the stored logic and the operand address.

31. The apparatus as set forth in claim 15, the detector to produce a signal for a dependency responsive to comparisons of the at least one operand to the subset of at least one source that correspond to a write-after-write dependency.

32. The apparatus set forth in claim 15, wherein at least one group of instructions includes stop bits.

33. An apparatus, comprising:
   a generating hardware structure to generate a sequence of instructions, the instructions including at least two operand addresses, wherein at least one of the at least two operand addresses is a source address;
   a dependency detector coupled to the hardware structure to select a plurality of groups of the instructions to detect invalid combinations within each group;
   wherein the dependency detector includes:
      a first multiplexer to randomly select operand sources to compare to register addresses available; and a second multiplexer to randomly select operand destinations to compare to register addresses available.

34. The apparatus set forth in claim 33, wherein at least one group of instructions includes stop bits.

* * * * *